(12) United States Patent
Zhu et al.

(10) Patent No.: US 11,543,423 B2
(45) Date of Patent: Jan. 3, 2023

(54) CUVETTE BOX CONVEYING DEVICE, CUVETTE BOX CONVEYING METHOD, AND SAMPLE ANALYZER

(71) Applicant: Shenzhen New Industries Biomedical Engineering Co., Ltd., Guangdong (CN)

(72) Inventors: Liang Zhu, Guangdong (CN); Shiming Feng, Guangdong (CN); Li Yin, Guangdong (CN); Yingzu Chang, Guangdong (CN)

(73) Assignee: Shenzhen New Industries Biomedical Engineering Co., Ltd., Shenzhen (CN)

( * ) Notice: Subject to any disclaimer, the term of this patent is extended or adjusted under 35 U.S.C. 154(b) by 482 days.

(21) Appl. No.: 16/709,955

(22) Filed: Dec. 11, 2019

(65) Prior Publication Data
US 2020/0209269 A1 Jul. 2, 2020

(30) Foreign Application Priority Data
Dec. 27, 2018 (CN) .......................... 201811611802.0

(51) Int. Cl.
*G01N 35/02* (2006.01)
*G01N 35/04* (2006.01)

(52) U.S. Cl.
CPC .......... *G01N 35/026* (2013.01); *G01N 35/04* (2013.01); *G01N 2035/0413* (2013.01); *G01N 2035/0425* (2013.01)

(58) Field of Classification Search
CPC ................. G01N 35/026; G01N 35/04; G01N 203/0425; G01N 203/0413
See application file for complete search history.

(56) References Cited

U.S. PATENT DOCUMENTS

| 2009/0003981 A1* | 1/2009 | Miller | G01N 35/04 |
| | | | 62/440 |
| 2010/0126286 A1 | 5/2010 | Self et al. | |
| 2013/0116102 A1* | 5/2013 | Hansen | B01D 43/00 |
| | | | 494/10 |
| 2020/0319219 A1* | 10/2020 | Vansickler | G01N 35/04 |
| 2021/0311082 A1* | 10/2021 | Tesluk | G01N 35/00732 |

FOREIGN PATENT DOCUMENTS

WO   WO-2017143182 A2 *   8/2017   ....... G01N 35/00732

* cited by examiner

*Primary Examiner* — Benjamin R Whatley
(74) *Attorney, Agent, or Firm* — Gang Yu

(57) ABSTRACT

The present disclosure relates to a cuvette box conveying device, a cuvette box conveying method, and a sample analyzer. The cuvette box conveying device includes a frame. The frame includes a new box placing position and a waste box recycling position. The new box placing position and the waste box recycling position are arranged on different layers in the direction of Z axis, so as to reduce the space occupied by the new box placing position and the waste box recycling position on an XY plane. In the cuvette box conveying device, the space occupied by the new box placing position and the waste box recycling position on the XY plane is reduced by arranging the new box placing position and the waste box recycling position on different layers in the direction of Z axis.

14 Claims, 11 Drawing Sheets

CUVETTE BOX CONVEYING DEVICE, CUVETTE BOX CONVEYING METHOD, AND SAMPLE ANALYZER

CROSS REFERENCE TO RELATED APPLICATIONS

The present disclosure claims benefit of Chinese Patent Application No. 201811611802.0, filed on Dec. 27, 2018, entitled "Cuvette box Conveying Device, Cuvette box Conveying Method, and Sample Analyzer", the contents of which are hereby incorporated by reference in its entirety.

TECHNICAL FIELD

The present disclosure relates to a field of medical instruments, in particular to a cuvette box conveying device, a cuvette box conveying method, and a sample analyzer.

BACKGROUND

In the field of medical instruments, a sample analyzer is used for detecting blood and other samples. Taking a chemiluminescence detector in the sample analyzer for example, the chemiluminescence detector usually includes a reaction cuvette feeding-in system, a sample adding system, and a luminescence detection system. The reaction cuvette feeding-in system conveys a reaction cuvette to the sample adding system. The sample adding system first performs the process of filling a sample and a reagent in the reaction cuvette, then, performs the process of incubating and cleaning the reaction cuvette after the filling process, and at last, the reaction cuvette is conveyed to the luminescence detection system for detection.

The chemiluminescence detector is widely used in immunoassay programs of hospitals and academic institutions. For the academic institutions and small and medium hospitals, small instruments are preferable due to the small number of samples to be tested of the immunoassay programs and site constraints, but the traditional chemiluminescence detector has a problem of large volume. How to reduce the volume of the chemiluminescence detector on the premise of full automation is a new research direction in the field of the chemiluminescence detector. But in the traditional small chemiluminescence detector, the reaction cuvette feeding-in system occupies a comparatively large instrument space.

SUMMARY

Based on this, it is necessary to provide a cuvette box conveying device occuvetteying a small space, a cuvette box conveying method, and a sample analyzer, aiming at the problem that a reaction cuvette feeding system of a traditional sample analyzer occupies a comparatively large space.

A cuvette box conveying device is provided. The device includes: a frame. The frame includes a new box placing position and a waste box recycling position. The new box placing position and the waste box recycling position are arranged on different layers in a direction of Z axis, so as to reduce a space occupied by the new box placing position and the waste box recycling position on an XY plane.

In the cuvette box conveying device, the space occupied by the new box placing position and the waste box recycling position on the XY plane is reduced by arranging the new box placing position and the waste box recycling position in the direction of Z axis in a staggered way. Compared with arranging the new box placing position and the waste box recycling position in order on the XY plane, the area of plane layout of the cuvette box conveying device can be reduced. Therefore, it is beneficial to obtaining a sample analyzer occupying a small space.

In an embodiment, the frame further includes an operating position. The operating position and the new box placing position are arranged on different layers and different positions in the direction of Z axis. The operating position and the waste box placing position are arranged on different layers and different positions in the direction of Z axis.

In an embodiment, in the direction of Z axis, the waste box recycling position is between the new box placing position and the operating position.

In an embodiment, the frame further includes a new box waiting position and a waste box waiting position. The new box waiting position and the new box placing position are on a same layer, and the new box waiting position directly faces the operating position in the direction of Z axis, so that a new box at the new box waiting position reaches the operating position along a positive direction of Z axis. The waste box waiting position and the waste box recycling position are on a same layer, and the waste box waiting position directly faces the operating position in the direction of Z axis, so that a waste box at the operating position reaches the waste box waiting position along a negative direction of Z axis.

In an embodiment, the frame is provided with a new box inlet for the new box to pass through to reach the new box placing position, and a waste box outlet for the waste box to pass through to reach an outside of the frame from the waste box recycling position. A position relationship between the new box inlet and the waster box outlet satisfies the following conditions: the new box reaches the new box placing position from the new box inlet along a positive direction of a first direction, the waste box reaches, by means of the waste box outlet, the outside of the frame from the waste box recycling position along a negative direction of the first direction, and the first direction is one of a direction of X axis and a direction of Y axis.

In an embodiment, when the frame further includes the new box waiting position and the waste box waiting position. The position relationship between the new box waiting position and the waste box waiting position satisfies the following conditions: the new box reaches the new box waiting position from the new box placing position along the positive direction of the first direction, and the waste box reaches the waste box recycling position from the waste box waiting position along the negative direction of the first direction.

In an embodiment, the cuvette box conveying device further includes: a first conveying mechanism, a Z-axis conveying mechanism, and a second conveying mechanism. The first conveying mechanism can convey the new box on the new box placing position to the new box waiting position along the positive direction of the first direction. The Z-axis conveying mechanism can convey the new box on the new box waiting position to the operating position along the positive direction of Z axis and can convey the waste box on the operating position to the waste box waiting position along the negative direction of Z axis. The second conveying mechanism can convey the waste box on the waste box waiting position to the waste box recycling position along the negative direction of the first direction.

In an embodiment, the first conveying mechanism can also convey the new box at the new box inlet to the new box placing position along the positive direction of the first direction. The frame is provided with a new box detecting sensor which is at the new box placing position. When the new box detecting sensor senses the new box placed from the new box inlet, the first conveying mechanism starts to work, and conveys the new box at the new box inlet to the new box placing position along the positive direction of the first direction.

In an embodiment, the second conveying mechanism can also convey the waste box at the waste box recycling position to the outside of the frame from the waste box outlet along the negative direction of the first direction.

In an embodiment, the frame includes a bottom plate, a middle plate and a top plate which are arranged in order on different layers. Two ends, in the first direction, of the bottom plate correspond to the new box placing position and the new box waiting position, respectively. The middle plate is arranged on the bottom plate, and the middle plate and the bottom plate are arranged separating from each other and facing each other in the direction of Z axis. The middle plate corresponds to the waste box recycling position. The top plate is arranged on the bottom plate, and the top plate and the bottom plate are arranged separating from each other and facing each other in the direction of Z axis. The top plate and the middle plate are arranged on different positions in the direction of Z axis. The top plate is provided with a through hole corresponding to the operating position. An area, which is located between the top plate and the bottom plate and is coplanar with the middle plate, corresponds to the waste box waiting position.

In an embodiment, a bottom of a cuvette box is provided with a fool-proof groove. The fool-proof groove extends along the first direction, and runs through two side faces, in the first direction, of the cuvette box. The surface, facing the middle plate, of the bottom plate is convexly provided with a fool-proof plate. The fool-proof plate and the fool-proof groove form a fool-proof component, so as to prevent the cuvette box from being placed at the new box placing position reversely.

In an embodiment, the Z-axis conveying mechanism includes a lifting plate which can move back and forth along the direction of Z axis, so as to bear the cuvette box at the new box waiting position, the operating position and the waste box waiting position.

The cuvette box conveying device further includes a barrier removing mechanism. The barrier removing mechanism is in retractable connection with the bottom plate. The barrier removing mechanism includes a blocking member and a connecting plate which are connected with each other. The blocking member is at the new box placing position, and the connecting plate is at the new box waiting position. When the lifting plate presses down the connecting plate, the blocking member and the connecting plate retract in the bottom plate, so that the cuvette box is conveyed from the new box placing position to the new box waiting position. When the lifting plate and the connecting plate are spaced in the direction of Z axis, the blocking member and the connecting plate protrude out of the bottom plate, so as to block the cuvette box from being conveyed from the new box placing position to the new box waiting position; and/or the frame further includes a guide rod. The guide rod is arranged on one end, close to the new box placing position, of the top plate, and is separated from the middle plate in the direction of Z axis, so as to form a cuvette box passage for the cuvette box to pass. The guide rod is used for preventing the lifting plate from moving deviating from the direction of Z axis, so that the cuvette box reaches the operating position and the waste box recycling position accurately.

In an embodiment, the second conveying mechanism is arranged on the middle plate. The second conveying mechanism includes a pushing rod. The pushing rod can move back and forth in the first direction and the direction of Z axis.

When there is a cuvette box at the waste box waiting position, a position of the pushing rod in the first direction and the direction of Z axis can be adjusted, so that the pushing rod hooks an inside, close to the waste box recycling position, of a baffle of the cuvette box. Consequently, when the pushing rod moves away from the operating position along the first direction, the pushing rod can push the cuvette box from the waste box waiting position to the waste box recycling position.

When there is a cuvette box at the waste box recycling position, a position of the pushing rod in the first direction and the direction of Z axis can be adjusted, so that the pushing rod hooks an outside, close to the operating position, of the baffle of the cuvette box. Consequently, when the pushing rod moves away from the operating position along the first direction, the pushing rod can push the cuvette box from the waste box recycling position to the outside of the frame through the waste box outlet.

In an embodiment, the cuvette box conveying device further includes a new cuvette buffering position. The new cuvette buffering position is arranged on the top plate. The new cuvette buffering position includes a plurality of placing grooves for placing the reaction cuvette. Consequently, when the operating position cannot provide the reaction cuvette, the new cuvette buffering position can provide the reaction cuvette, thereby realizing continuous loading of the reaction cuvette.

A cuvette box conveying method is provided. The method includes the following steps.

A new box is conveyed from the new box placing position to the operating position along a first direction and a direction of Z axis. The first direction is the direction of X axis or the direction of Y axis. After all the reaction cuvettes of the new box at the operating position are taken out, the new box at the operating position becomes a waste box.

The waste box is conveyed from the operating position to the waste box recycling position along the first direction and the direction of Z axis.

In an embodiment, that the new box is conveyed from the new box placing position to the operating position along the first direction and the direction of Z axis includes the following operations: the new box is conveyed from the new box placing position to a new box waiting position along a positive direction of the first direction, and the new box is conveyed from the new box waiting position to the operating position along a positive direction of the direction of Z axis; and/or that the waste box is conveyed from the operating position to the waste box recycling position along the first direction and the direction of Z axis includes the following operations: the waste box is conveyed from the operating position to a waste box waiting position along a negative direction of Z axis, and the waste box is conveyed from the waste box waiting position to the waste box recycling position along a negative direction of the first direction.

In an embodiment, the cuvette box conveying method further includes the following steps: the new box is conveyed to the new box placing position along the positive direction of the first direction; and/or, the waste box is conveyed out along the negative direction of the first direction.

A sample analyzer is provided, including the cuvette box conveying device.

DETAILED DESCRIPTION OF THE EMBODIMENTS

In order to make the purpose, characteristics and advantages of the present disclosure more obvious and understandable, the specific implementation modes of the present disclosure will be further described below in combination with the drawings in detail. Many specific details are described below, so as to full understand the present disclosure. However, the present disclosure can be implemented in many other ways different from that described here. Those skilled in the art can make similar improvements without violating the connotation of the present disclosure, so the present disclosure is not limited to the following disclosed specific implementation.

It is to be noted that when a component is "fixed to" another component, it can be directly on another component, or there may be an intermediate component between them. When a component is considered to be "connected to" another component, it can be directly connected to another component, or there may be an intermediate component between them.

Unless otherwise defined, all technical and scientific terms in the specification have the same meaning as those skilled in the art, belonging to the present disclosure, usually understand. The terms in the specification of the present disclosure are only used for describing the specific embodiments, but not intended to limit the present disclosure. The term "and/or" in the specification refers to inclusion of any or all combinations of one or more than one associated items which are listed.

Figure 1:
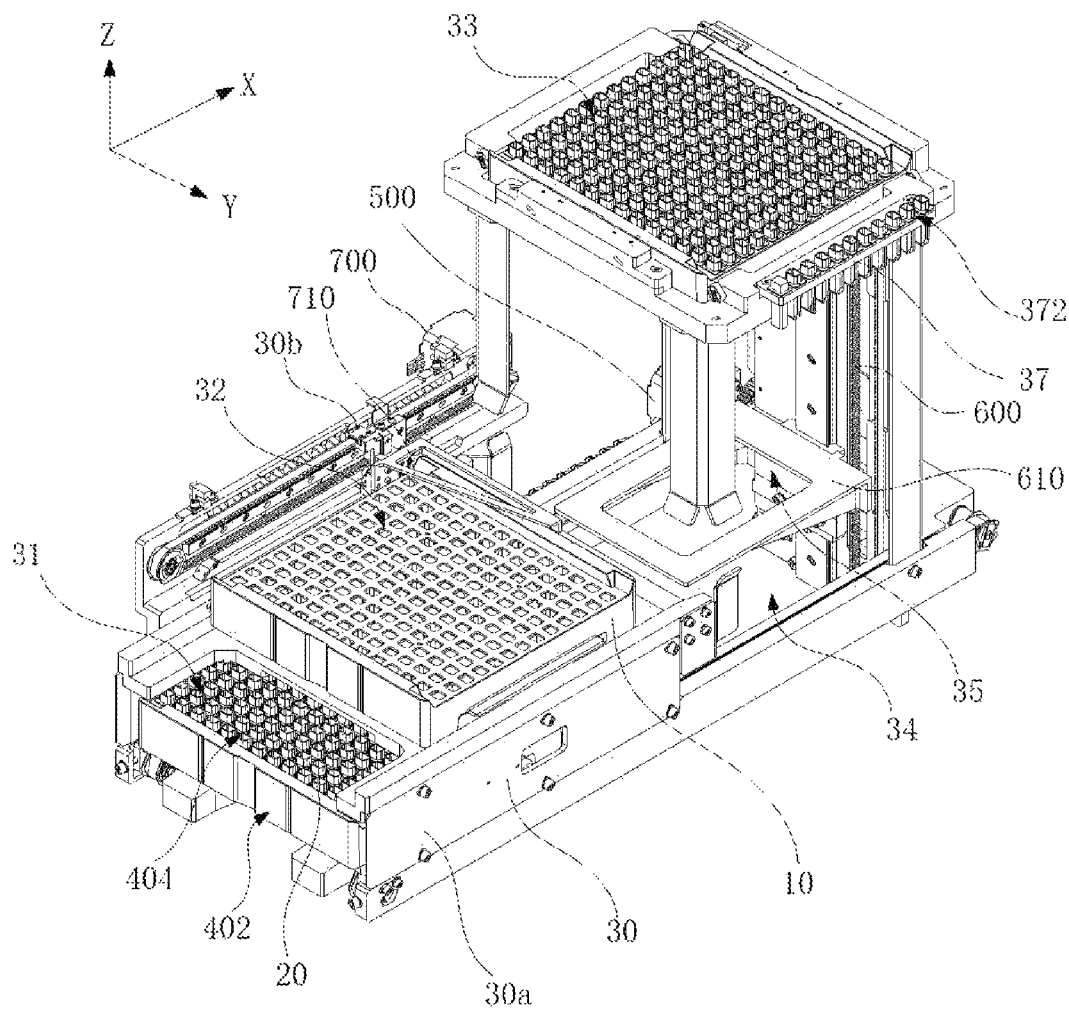
FIG. 1 is a stereogram of a sample analyzer provided by an embodiment of the present disclosure.
Figure 2:
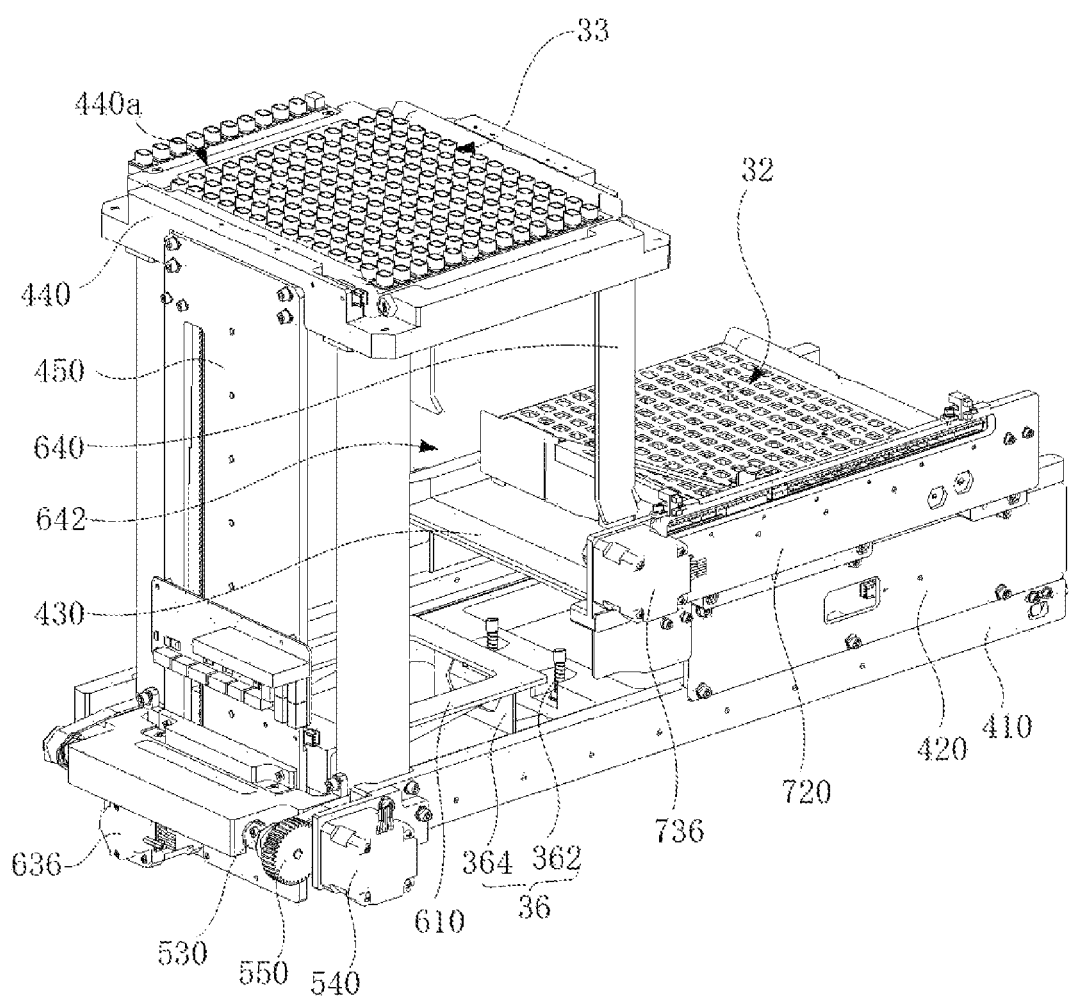
FIG. 2 is a stereogram of another perspective of the sample analyzer illustrated in FIG. 1.
Figure 3:
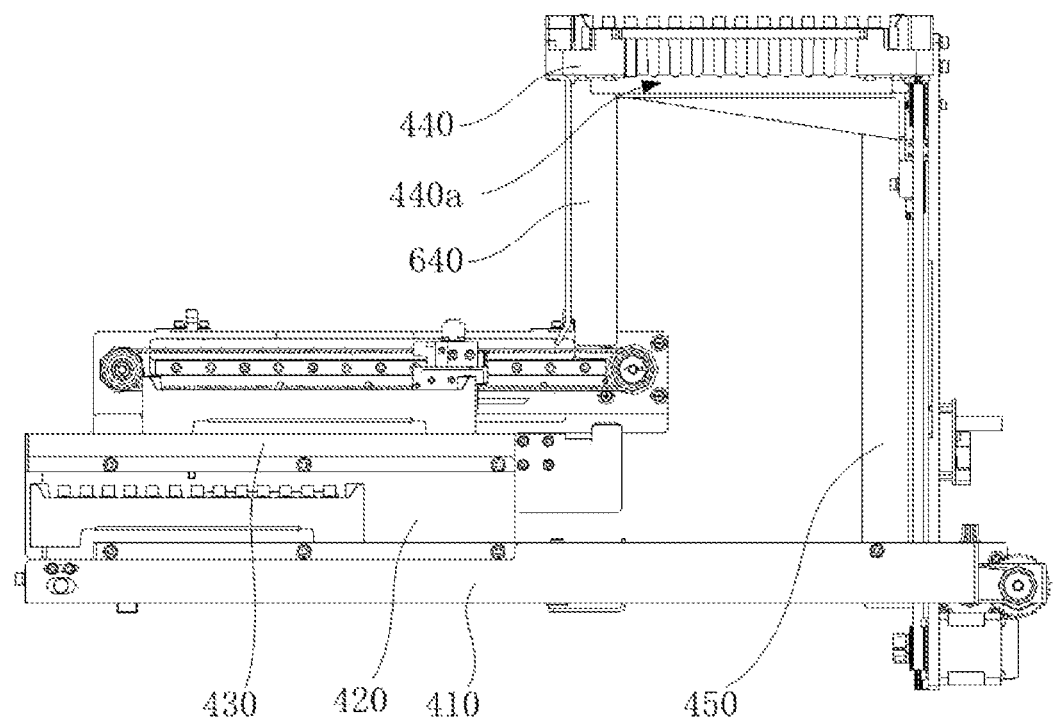
FIG. 3 is a side view of the sample analyzer illustrated in FIG. 1.

As illustrated in FIG. 1, FIG. 2 and FIG. 3, a sample analyzer provided by an embodiment of the present disclosure includes a cuvette box 10, a reaction cuvette 20, and a cuvette box conveying device 30. The cuvette box 10 is used for bear the reaction cuvette 20. The cuvette box 10 fully loaded with the reaction cuvettes 20 is a new box. After the reaction cuvettes 20 in the new box are used up, the new box becomes a waste box. The cuvette box conveying device 30 can convey the new box from a new box placing position 31 of the cuvette box conveying device 30 to an operating position 33 of the cuvette box conveying device 30, at this point, a grasper of the sample analyzer can convey the reaction cuvette 20 at the operating position 33 to a sample adding plate of a sample adding system. After the reaction cuvettes 20 at the operating position 33 are used up, the cuvette box becomes from the new box to the waste box, and then, the cuvette box conveying device 30 conveys the waste box to the waste box recycling position 32 of the cuvette box conveying device 30, so as to convey the waste box to the outside of the cuvette box conveying device 30. In some embodiments, the sample analyzer is a chemiluminescence detector.

Figure 4:
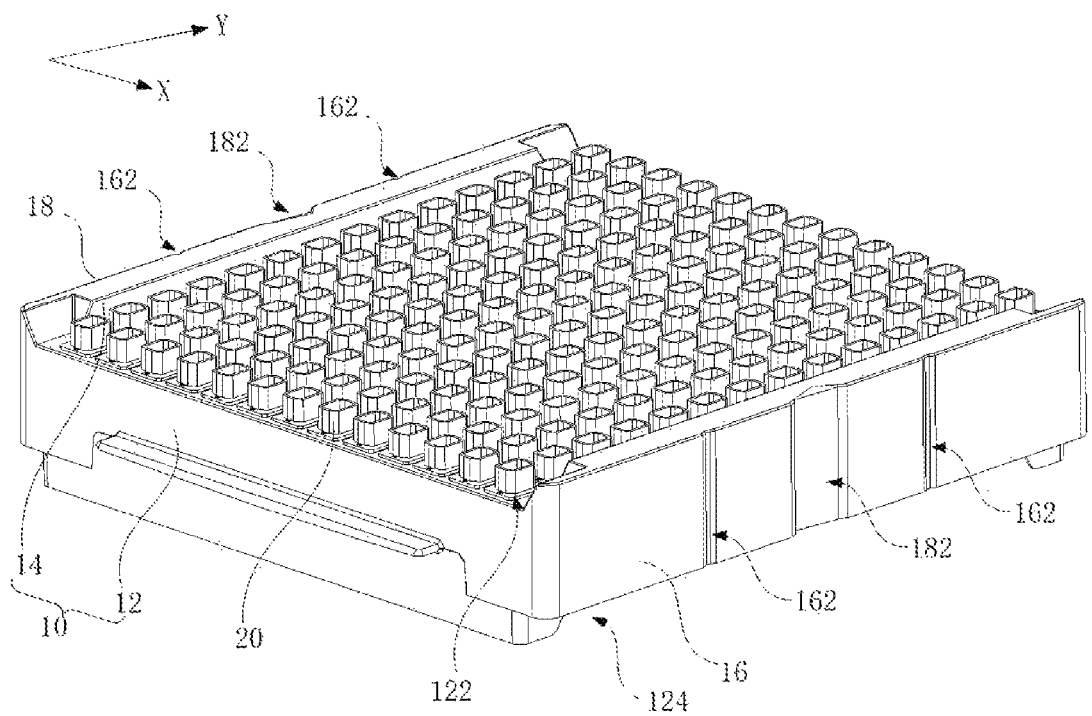
FIG. 4 is a stereogram of a cuvette box fully loaded with reaction cuvettes provided by an embodiment of the present disclosure.
Figure 5:
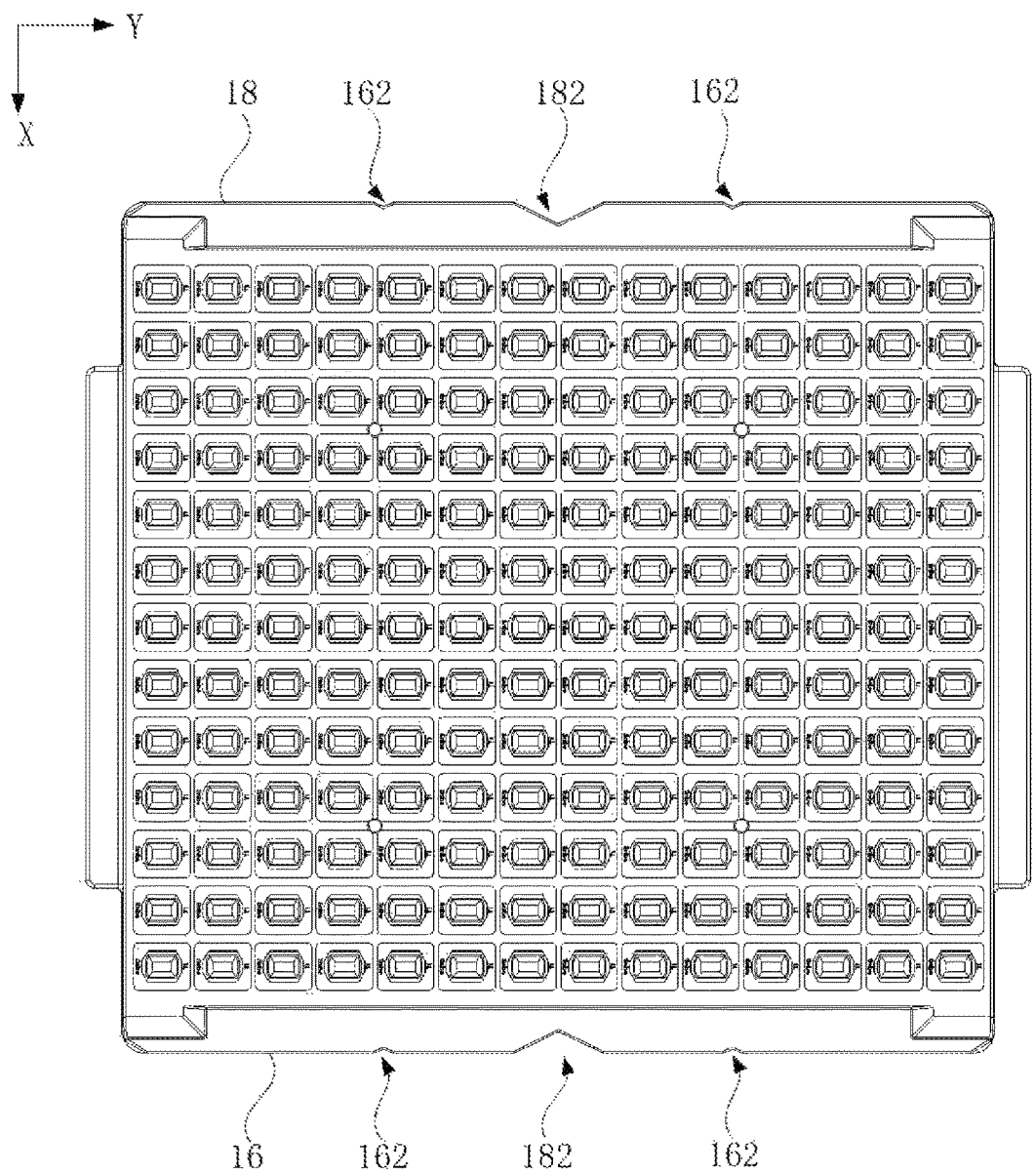
FIG. 5 is a top view of FIG. 4.
Figure 6:
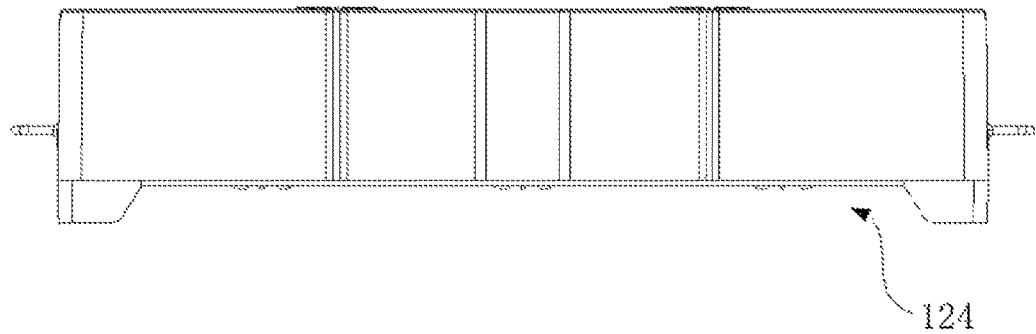
FIG. 6 is a side view of FIG. 4 in the direction of X axis.

As illustrated in FIG. 4, FIG. 5 and FIG. 6, the cuvette box 10 provided by an embodiment of the present disclosure includes a base 12 and a baffle 14 which is arranged at the top of the base 12 in a circle. The top of the base 12 is provided with a plurality of accommodating grooves 122. The plurality of accommodating grooves 122 are arranged in an array. The reaction cuvette 20 is placed in the accommodating groove 122.

Figure 7:
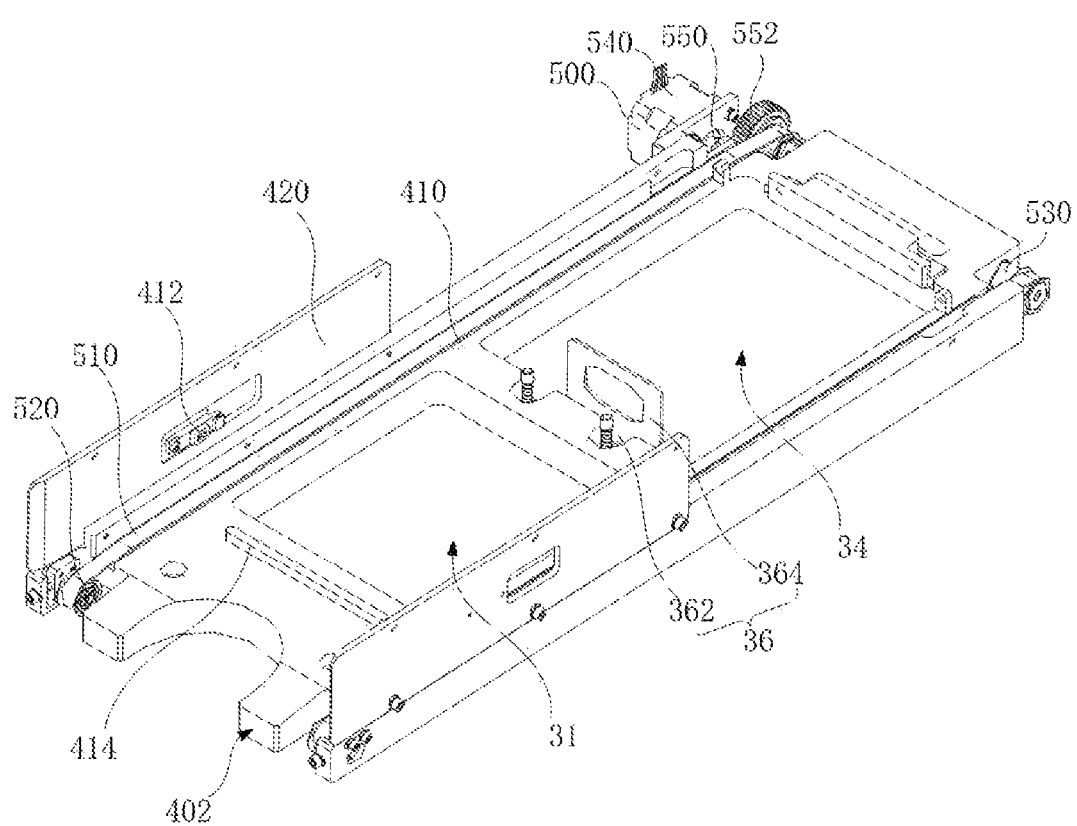
FIG. 7 is a schematic diagram of assembling a first conveying mechanism and a bottom plate.

As illustrated in FIG. 4 and FIG. 7, in some embodiments, the bottom of the base 12 is provided with a fool-proof groove 124. The fool-proof groove 124 extends along the direction of X axis, and runs through two side faces, the direction of X axis, of the base 12. When the cuvette box 10 is placed in the cuvette box conveying device 30 along the direction of X axis, the fool-proof groove 124 can avoid a fool-proof plate 414 of the cuvette box conveying device 30, and the cuvette box 10 can keep moving along the direction of X axis; and when the cuvette box 10 is placed in the cuvette box conveying device 30 along the direction of Y axis, the side face, in the direction of Y axis, of the cuvette box 10 will lean against the fool-proof plate 414, that is, the fool-proof plate 414 will block the cuvette box 10 from keeping moving along the direction of X axis. The fool-proof groove 124 cooperates with the fool-proof plate 414 of the cuvette box conveying device 30, and they form a fool-proof component; in such a manner, it can be determined whether the direction of placing the cuvette box 10 is right, so as to prevent the cuvette box 10 from being placed reversely.

As illustrated in FIG. 4, FIG. 5 and FIG. 6, in some embodiments, the cuvette box 10 includes a first side plate 16 and a second side plate 18 which are arranged facing each other. The outer side face of the first side plate 16 is provided with a first positioning slot 162, and the outer side face of the second side plate 18 is provided with a second positioning slot 182. In some embodiments, the sum of the number of the first positioning slots 162 on the first side plate 16 and the number of the second positioning slots 182 on the second side plate 18 is greater than or equal to 3. In some embodiments, the number of the first positioning slots 162 on the first side plate 16 is two, and the number of the second positioning slots 182 on the second side plate 18 is 1. The second positioning slot 182 on the second side plate 18 is between the two first positioning slots 162 on the first side plate 16.

In some embodiments, the opening width of the first positioning slot 162 is less than the opening width of the second positioning slot 182. In some embodiments, the opening width of the first positioning slot 162 is 1:15-1:2 of the opening width of the second positioning slot 182. In some embodiments, both the first positioning slot 162 and the second positioning slot 182 are circular-arc-shaped slot. The radius of the circle corresponding to the first positioning slot 162 is 1:15-1:2 of the radius of the circle corresponding to the second positioning slot 182.

In some embodiments, the first side plate 16 is provided with both the first positioning slot 162 and the second positioning slot 182, the second side plate 18 is also provided with both the first positioning slot 162 and the second positioning slot 182, and the first positioning slot 162 and the second positioning slot 182 on the first side plate 16 directly face the first positioning slot 162 and the second positioning slot 182 on the second side plate 18 respectively, that is, the first side plate 16 and the second side plate 18 have the same structure, so there are no positive and negative directions of the first side plate 16 and the second side plate 18, and the cuvette box can be placed at the new box placing position 31 from the side where the first side plate 16 is or from the side where the second side plate 18 is. In some embodiments, the first side plate 16 and the second side plate 18 are arranged with spacing along the direction of X axis.

As illustrated in FIG. 1, FIG. 2 and FIG. 3, the cuvette box conveying device 30 includes a frame 30a and a conveying mechanism 30b. The frame 30a includes a new box placing position 31, a waste box recycling position 32, and an operating position 33.

The new box placing position 31 and the waste box recycling position 32 are arranged on different layers in the direction of Z axis (vertical direction), that is, the new box placing position 31 and the waste box recycling position 32 are at different heights in the direction of Z axis, corresponding to the layers of different heights. The new box placing position 31 and the waste box recycling position 32 have an overlapping area in the direction of Z axis, that is, the new box placing position 31 and the waste box recycling position 32 have a directly-facing area in the direction of Z axis. Compared with a mode of arranging the new box placing position 31 and the waste box recycling position 32 in parallel on the XY plane, the space on the XY plane occupied by the new box placing position 31 and the waste box recycling position 32 can be reduced, thereby reducing the space on the XY plane occupied by the cuvette box conveying device 30, reducing the area of plane layout of the cuvette box conveying device 30, and reducing the overall volume of the sample analyzer.

In some embodiments, the operating position 33 and the new box placing position 31 are arranged on different layers and different positions in the direction of Z axis, and the operating position 33 and the waste box placing position 32 are arranged on different layers and different positions in the direction of Z axis. That is, the operating position 33 and the new box placing position 31 are at different heights in the direction of Z axis, corresponding to the layers of different heights. The operating position 33 and the new box placing position 31 do not have the overlapping area or the directly-facing area in the direction of Z axis. The operating position 33 and waste box recycling position 32 are at different heights in the direction of Z axis, corresponding to the layers of different heights. The operating position 33 and waste box recycling position 32 do not have the overlapping area or the directly-facing area in the direction of Z axis. In some other embodiments, the operating position 33 can also be on the same layer with the new box placing position 31 or the waste box recycling position 32, and the operating position 33 can also have the overlapping area with the new box placing position 31 or the waste box recycling position 32 which is on the layer different from the operating position 33.

In some embodiments, in the direction of Z axis, the waste box recycling position 32 is between the new box placing position 31 and the operating position 33. Taking the viewing angle in FIG. 1 for example, that is, the new box placing position 31 is on a bottom layer, the waste box recycling position 32 is on a middle layer, and the operating position 33 is on a top layer, it can be understood that when the viewing angle in FIG. 1 is inverted, the new box placing position 31 can also be on the top layer, and the operating position 33 can also be on the bottom layer. In the above embodiment, the waste box recycling position 32, as the middle layer, can shorten a conveying path and improve a conveying efficiency. In some other embodiments, both the new box placing position 31 and the operating position 33 can serve as the middle layer.

In some embodiments, the frame 30a further includes a new box waiting position 34 and a waste box waiting position 35. The new box waiting position 34 and the new box placing position 31 are on the same layer, and a position relationship between the new box waiting position 34 and the new box placing position 31 satisfies the following condition: the new box reaches the new box waiting position 34 from the new box placing position 31 in a straight line. Taking the viewing angle in FIG. 1 for example, the new box reaches the new box waiting position 34 from the new box placing position 31 along the positive direction of X axis. The new box waiting position 34 directly faces the operating position 33 in the direction of Z axis, so that the new box at the new box waiting position 34 can reach the operating position 33 along the positive direction of Z axis. The waste box waiting position 35 directly faces the operating position 33 in the direction of Z axis, so that the waste box at the operating position 33 can reach the waste box waiting position 35 along the negative direction of Z axis. The waste box waiting position 35 and the waste box recycling position 32 are on the same layer, and the position relationship between the waste box waiting position 35 and the waste box recycling position 32 satisfies the following condition: the waste box reaches the waste box recycling position 32 from the waste box waiting position 35 in a straight line. Taking the viewing angle in FIG. 1 for example, the waste box reaches the waste box recycling position 32 from the waste box waiting position 35 along the negative direction of X axis.

Specifically, taking the viewing angle in FIG. 1 for example, when the cuvette box conveying device 30 works, the conveying mechanism 30b can convey the new box from the new box placing position 31 to the new box waiting position 34 along the positive direction of X axis, and then convey the new box from the new box waiting position 34 to the operating position 33 along the positive direction of Z axis. The conveying mechanism 30b can also convey the waste box from the operating position 33 to the waste box waiting position 35 along the negative direction of Z axis, and then convey the waste box from the waste box waiting position 35 to the waste box recycling position 32 along the negative direction of X axis. In some other embodiments, when the new box placing position 31 is above the waste box recycling position 32, the new box can also move to a position which is higher than the operating position 33 along the positive direction of Z axis at first; then, the new box moves to the position right above the operating position 33 along the positive direction of X axis; and at last, the new box moves to the operating position 33 along the negative direction of Z axis. After the new box becomes a waste box, the waste box moves from the operating position 33 to the position which is on the same layer as the waste box waiting position 35 along the negative direction of Z axis; then, the waste box moves to the waste box recycling position 32 along the negative direction of X axis.

In the above embodiment, because the cuvette box conveying device 30 moves only in the direction of X axis and the direction of Z axis, compared with the cuvette box conveying device moving in the direction of X axis, the direction of Y axis and the direction of Z axis, the cuvette box conveying device 30 has simpler structure.

In some embodiments, the frame 30a is provided with a new box inlet 402 and a waste box outlet 404. The new box inlet 402 is for the new box to pass through to reach the new box placing position 31. The waste box outlet 404 is for the waste box to pass through to reach the outside of the frame 30a from the waste box recycling position 32. The position relationship between the new box inlet 402 and the waster box outlet 404 satisfies the following conditions: the new box reaches the new box placing position 31 from the new box inlet 402 along the positive direction of X axis, and the waste box reaches, by means of the waste box outlet 404, the outside of the frame 30a from the waste box recycling position 32 along the negative direction of X axis. Consequently, the feeding-in of the new box and the feeding-out of the waste box are at the same side, which is very convenient for a user to load the new box and take out the waste box at the same side.

In some embodiments, the conveying mechanism 30b includes a first conveying mechanism 500, a Z-axis conveying mechanism 600, and a second conveying mechanism 700. The first conveying mechanism 500 can convey the new box on the new box placing position 31 to the new box waiting position 34 along the positive direction of X axis. The Z-axis conveying mechanism 600 can convey the new box on the new box waiting position 34 to the operating position 33 along the positive direction of Z axis and can convey the waste box on the operating position 33 to the waste box waiting position 35 along the negative direction of Z axis. The second conveying mechanism 700 can convey the waste box on the waste box waiting position 35 to the waste box recycling position 32 along the negative direction of X axis. The cuvette box conveying device 30 has advantages of having a high degree of automation and occupying a small instrument space.

Figure 8:
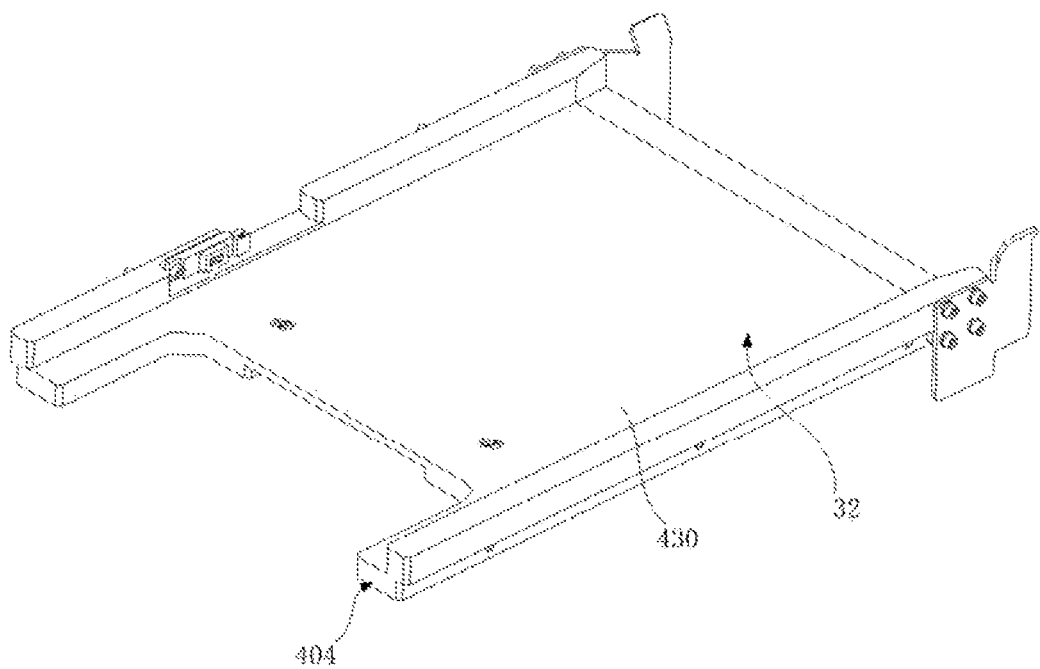
FIG. 8 is a structure diagram of a middle plate.

In some embodiments, the first conveying mechanism 500 can also convey the new box, which is at the new box inlet 402 and is not completely placed in the frame 30a, to the new box placing position 31 along the positive direction of X axis, so the user can be provided with operation experience that the cuvette box conveying device 30 automatically receive the reaction cuvette 20. Specifically, as illustrated in FIG. 8, in some embodiments, the frame 30a is provided with a new box detecting sensor 412 which is at the new box placing position 31. When the new box detecting sensor 412 senses the new box placed from the new box inlet 402, the first conveying mechanism 500 starts to work, and conveys the new box, which is at the new box inlet 402 and is not completely placed in the frame 30a, to the new box placing position 31 along the positive direction of X axis. In some embodiments, when ½ to ¾ of the new box is placed in the frame 30a, the new box detecting sensor 412 at the inlet can sense the new box placed from the new box inlet 402.

In some embodiments, the second conveying mechanism 700 can also convey the waste box at the waste box recycling position 32 from the waste box outlet 404 to the outside of the frame 30a along the negative direction of X axis.

As illustrated in FIG. 1, FIG. 2 and FIG. 3, in some embodiments, the frame 30a includes a bottom plate 410, a middle plate 430 and a top plate 440. Two ends, in the direction of X axis, of the bottom plate 410 correspond to the new box placing position 31 and the new box waiting position 34, respectively; The middle plate 430 is arranged on the bottom plate 410, and the middle plate 430 and the bottom plate 410 are arranged separating from each other and facing each other in the direction of Z axis. The middle plate 430 corresponds to the waste box recycling position 32. The top plate 440 is arranged on the bottom plate 410, and the top plate 440 and the bottom plate 410 are arranged separating from each other and facing each other in the direction of Z axis. The top plate 440 and the middle plate 430 are arranged on different positions in the direction of Z axis. The top plate 440 is provided with a through hole 440a. The through hole 440a corresponds to the operating position 33. The area, which is between the top plate 440 and the bottom plate 410 and is coplanar with the middle plate 430, corresponds to the waste box waiting position 35.

In some embodiments, the frame 30a further includes two connecting plates 420 and a vertical plate 450. The two connecting plates 420 are arranged with spacing and in parallel along the direction of Y axis, and each connecting plate 420 is connected to the bottom plate 410 and the middle plate 430, respectively. The bottom plate 410, the middle plate 430 and the two connecting plates 420 form a new box accommodating chamber. The vertical plate 450 is on one end, far away from the new box placing position 31, of the bottom plate 410, and two sides, in the direction of Z axis, of the vertical plate 450 are respectively connected to the bottom plate 410 and the top plate 440. As illustrated in FIG. 7 and FIG. 8, the surface, close to the middle plate 430, of the bottom plate 410 is convexly provided with a foolproof plate 414; and the new box detecting sensor 412, which is in the new box accommodating chamber, is arranged on the connecting plate 420.

The first conveying mechanism 500 is arranged on the bottom plate 410. As illustrated in FIG. 7, in some embodiments, the first conveying mechanism 500 is a conveying mechanism with conveyor belt. The first conveying mechanism 500 includes a first conveyor belt 510, a first belt wheel 520, a first rotation shaft 530, and a first motor 540. The number of the first conveyor belts 510 is two. The two first conveyor belts 510 are sleeved on the bottom plate 410 by means of four first belt wheels 520, and are arranged with spacing and in parallel along the direction of Y axis. The first conveyor belt 510 directly contacts and conveys the new box. The first rotation shaft 530 is arranged through the bottom plate 410, and is rotationally connected to the bottom plate 410. In the direction of X axis, the first rotation shaft 530 is connected to two first belt wheels 520 on the same end, and the two first belt wheels 520 on the other end are independent from each other. The first motor 540 is fixed on the bottom plate 410, and is connected to one end of the first rotation shaft 530. In some embodiments, the first conveying mechanism 500 further includes a gear set 550. The gear set 550 includes a plurality of gears 552 engaged. The gear 552 on one end of the gear set 550 is sleeved and fixed on the output shaft of the first motor 540, and the gear 552 on the other end of the gear set 550 is sleeved and fixed to the first rotation shaft 530.

As illustrated in FIG. 1, FIG. 2, and FIG. 3, the Z-axis conveying mechanism 600 is arranged on the vertical plate 450. The Z-axis conveying mechanism 600 includes a lifting plate 610. The lifting plate 610 directly faces the new box waiting position 34. The lifting plate 610 can take the new box at the new box waiting position 34 and convey the new box to the through hole 440a (the operating position 33) of the top plate 440, and can convey the waste box from the operating position 33 to the waste box waiting position 35.

Figure 9:
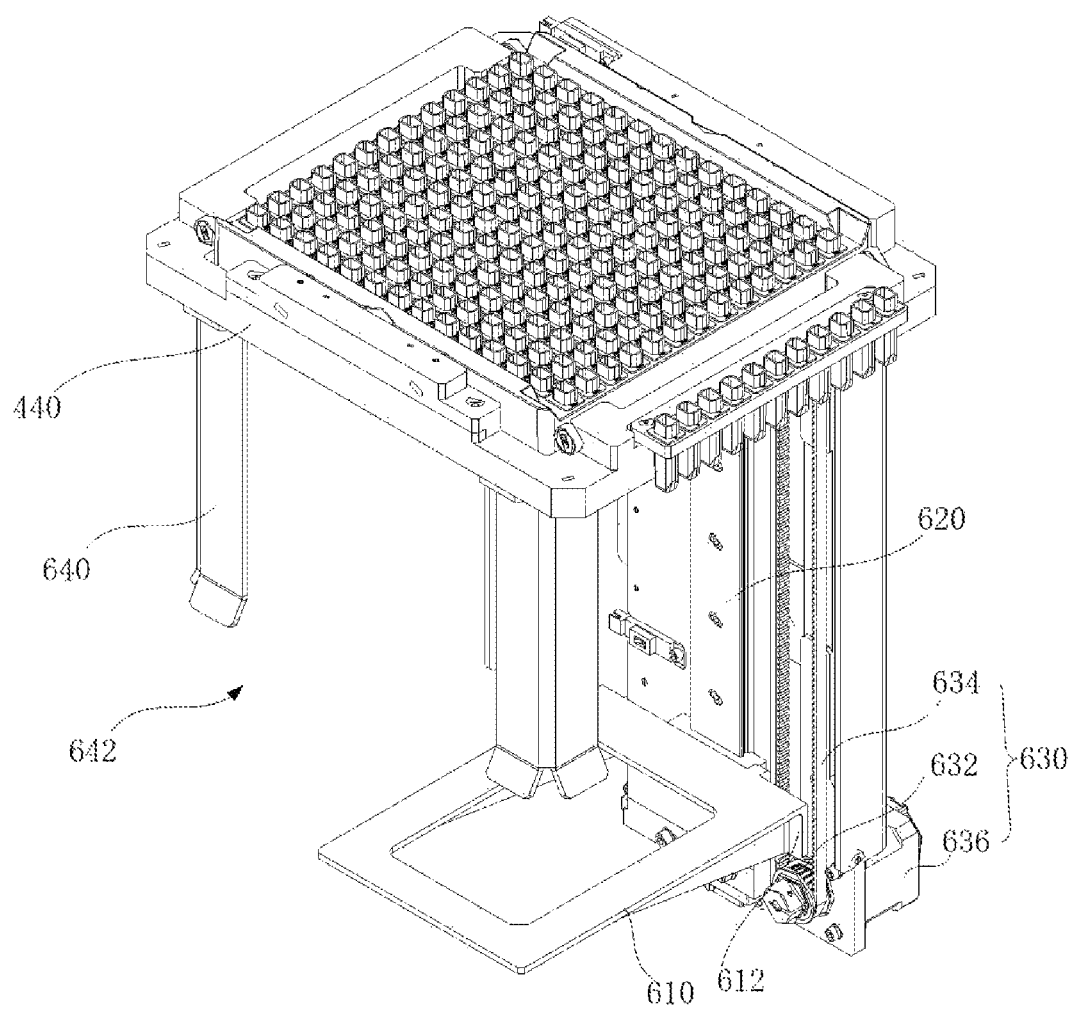
FIG. 9 is a schematic diagram of assembling a Z-axis conveying mechanism and a top plate.

As illustrated in FIG. 9, in some embodiments, the Z-axis conveying mechanism 600 further includes a Z-axis guide rail 620 and a lifting driving component 630. The Z-axis guide rail 620 is arranged on the side face, close to the waste box recycling position 32, of the vertical plate 450. The lifting plate 610 is in sliding connection with the Z-axis guide rail 620, and is connected to the lifting driving component 630. Driven by the lifting driving component 630, the lifting plate 610 can move back and forth along the Z-axis guide rail 620 in the direction of Z axis.

In some embodiments, the lifting driving component 630 includes a Z-axis drive gear 632, a Z-axis conveyor belt 634, and a Z-axis motor 636. The number of the Z-axis drive gears 632 is two. The two Z-axis drive gears 632 are arranged with spacing in the direction of Z axis. The Z-axis conveyor belt 634 is sleeved on the two Z-axis drive gears 632, and is engaged with the two Z-axis drive gears 632, respectively. The Z-axis motor 636 is arranged on the vertical plate 450, and is connected to one of the two Z-axis drive gears 632. The lifting plate 610 has an engagement part 612. The engagement part 612 is engaged with the Z-axis conveyor belt 634. When rotating, the Z-axis motor 636 drives the Z-axis conveyor belt 634 to move in a circle, thereby driving the lifting plate 610 to move back and forth along the Z-axis guide rail 620 in the direction of Z axis.

As illustrated in FIG. 2 and FIG. 9, in some embodiments, the Z-axis conveying mechanism 600 further includes a guide rod 640. The guide rod 640 is arranged on one end, close to the new box placing position 31, of the top plate 440. The guide rod 640 is used for preventing the lifting plate 610 from moving deviating from the direction of Z axis, so as to ensure the lifting plate 610 to enter the through hole 440a accurately. In some embodiments, the guide rod 640 is separated from the middle plate 430 in the direction of Z axis to form a cuvette box passage 642. The cuvette box passage 642 is for the cuvette box to pass through, that is, the guide rod 640 is designed to be hollow, and has only a half. In some embodiments, the guide rod 640 is made of relatively light materials (for example, aluminum alloy), so the top plate 440 is less likely to incline on the XY plane (horizontal plane), and then, the accuracy of positioning the cuvette box 10 will not be influenced.

In some embodiments, the number of the guide rods 640 is two. The two guide rods 640 correspond to two corners of the lifting plate 610, respectively. In some embodiments, the shape of the guide rod 640 matches with the shape of the corner of the lifting plate 610. In some embodiments, the guide rod 640 is a right-angled folded plate, and the corner of the lifting plate 610 is a right-angled corner.

In some embodiments, as illustrated in FIG. 2 and FIG. 7, the cuvette box conveying device 30 further includes a barrier removing mechanism 36. The barrier removing mechanism 36 is in retractable connection with the bottom plate 410. The barrier removing mechanism 36 includes a blocking member 362 and a connecting plate 364 which are connected with each other. The blocking member 362 is at the new box placing position 31, and the connecting plate 364 is at the new box waiting position 34. When the lifting plate 610 presses down the connecting plate 364, the blocking member 362 and the connecting plate 364 retract in the bottom plate 410, so that the cuvette box is conveyed from the new box placing position 31 to the new box waiting position 34. When the lifting plate 610 and the connecting plate 364 are spaced in the direction of Z axis, the blocking member 362 and the connecting plate 364 protrude out of the bottom plate 410, so as to block the cuvette box from being conveyed from the new box placing position 31 to the new box waiting position 34. In some embodiments, a spring is arranged between the connecting plate 364 and the bottom plate 410. When the lifting plate 610 presses down the connecting plate 364, the spring is compressed, the blocking member 362 and the connecting plate 364 move down and retract in the bottom plate 410. When the lifting plate 610 and the connecting plate 364 are spaced in the direction of Z axis, the spring returns to its original state, and the blocking member 362 and the connecting plate 364 move up and protrude out of the bottom plate 410.

As illustrated in FIG. 1, FIG. 2 and FIG. 3, in some embodiments, the second conveying mechanism 700 is arranged on the middle plate 430. The second conveying mechanism 700 includes a pushing rod 710. The pushing rod 710 is able to move back and forth in the direction of X axis and the direction of Z axis. When the lifting plate 610 drives the waste box to the waste box waiting position 35, the position of the pushing rod 710 in the direction of X axis and the direction of Z axis is adjusted, so that the pushing rod 710 hooks an inside, close to the waste box recycling position, of a baffle 14 of the cuvette box. The pushing rod 710 moves along the negative direction of X axis to push the waste box from the waste box waiting position 35 to the waste box recycling position 32. Then, the position of the pushing rod 710 in the direction of X axis and the direction of Z axis is adjusted, so that the pushing rod 710 hooks an outside (namely the state under the viewing angle in FIG. 1), close the operating position 33, of the baffle 14 of the cuvette box (at the waste box recycling position 32). The pushing rod 710 moves along the negative direction of X axis to push the waste box from the waste box recycling position 32 to the outside of the frame 30a through the waste box outlet.

Figure 10:
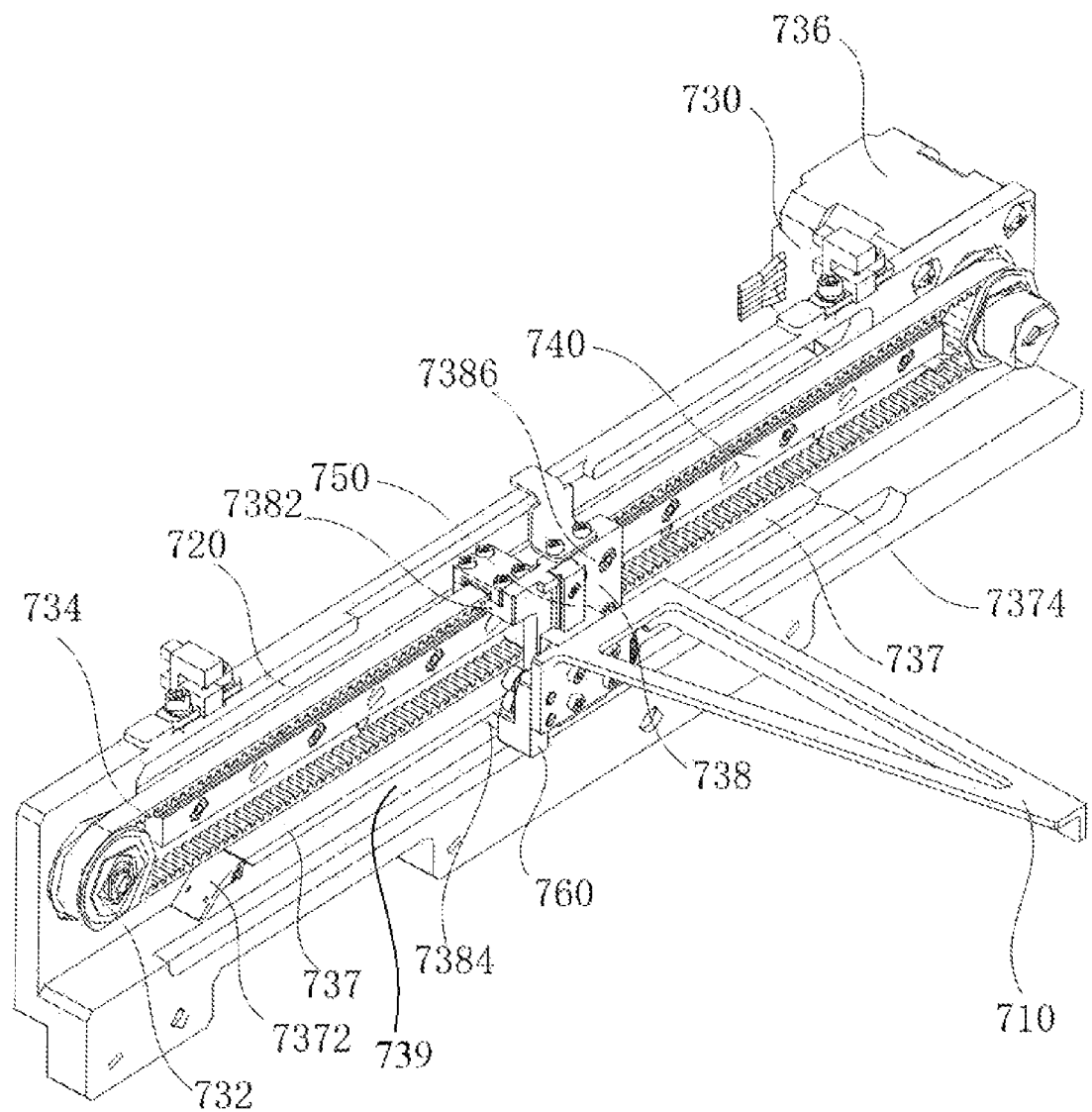
FIG. 10 is a structure diagram of a second conveying mechanism.

As illustrated in FIG. 2 and FIG. 10, in some embodiments, the second conveying mechanism 700 further includes: a mounting plate 720, an XZ-axis driving component 730, a horizontal guide rail 740, a vertical guide rail 750 and an adjusting base 760. The mounting plate 720 is arranged on the side face, in the direction of Y axis, of the middle plate 430, and extends along the direction of X axis.

The XZ-axis driving component 730 includes an X-axis drive gear 732, an X-axis conveyor belt 734, an X-axis motor 736, a guide plate 737, a mounting base 738 and a guide plate 739. The X-axis drive gear 732 is arranged on the mounting plate 720. The number of the X-axis drive gears 732 is two. The two X-axis drive gears 732 are arranged with spacing in the direction of X axis. The X-axis conveyor belt 734 is sleeved on the two X-axis transmission gears 732, and is engaged with the two X-axis transmission gears 732, respectively. The X-axis motor 736 is arranged on the mounting plate 720, and is connected to one of the two X-axis transmission gears 732.

Figure 10A:
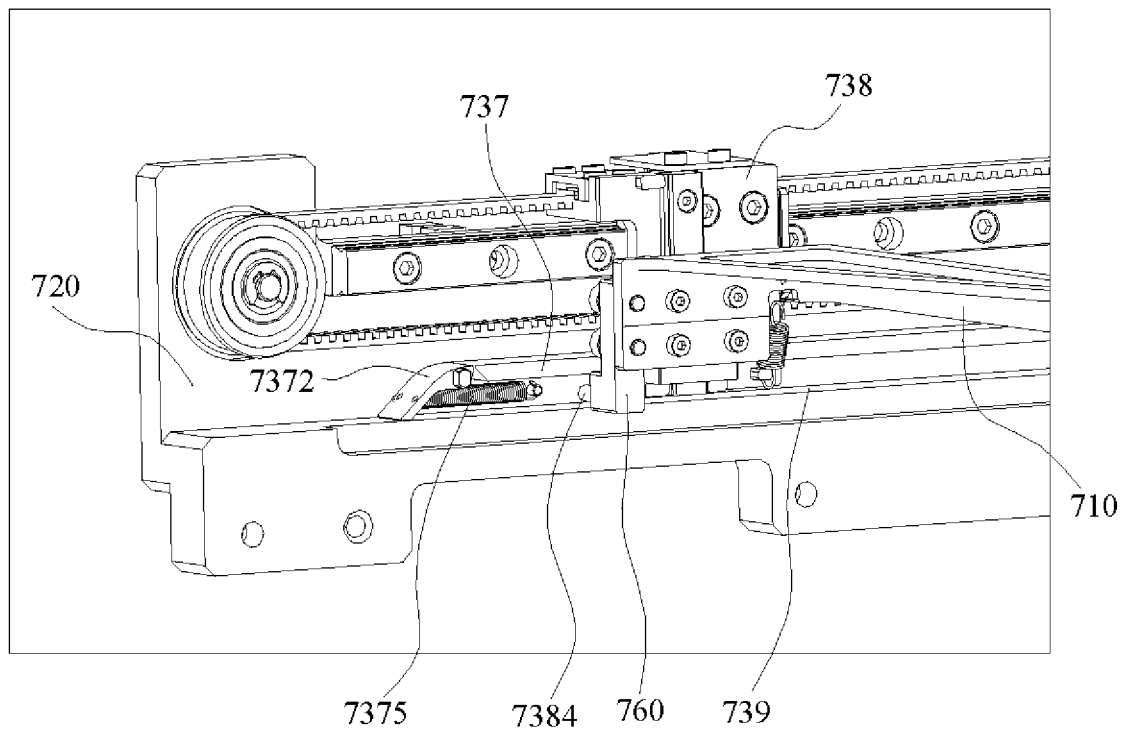
FIG. 10a is a partial structure diagram of a second conveying mechanism.

The guide plate 737 and the guide plate 739 are arranged between the X-axis conveyor belt 734 and the middle plate 430, and extends along the direction of X axis. One end, far away from the operating position 33, of the guide plate 737 is provided with an inclined block 7372. As illustrated in FIG. 10 and FIG. 10a, The guide plate 739 is located below the guide plate 737, and the inclined block 7372 is rotatably connected to the mounting plate 720. A tension spring 7375 is provided between the inclined block 7372 and the mounting plate 720. The mounting base 738 includes a side plate 7382, and a back plate 7386 connecting the side plate 7382. The side plate 7382 extends in the X-axis conveyor belt 734, and is engaged with the X-axis conveyor belt 734.

The horizontal guide rail 740 is arranged on the mounting plate 720, and is in the X-axis conveyor belt 734. The surface, close to the mounting plate 720, of the back plate 7386 is in sliding connection with the horizontal guide rail 740. The vertical guide rail 750 is arranged on the surface, far away from the mounting plate 720, of the back plate 7386, and is in sliding connection with the pushing rod 710. The adjusting base 760 is fixedly connected with the pushing rod 710, and the adjusting base 760 is provided with a pin 7384.

The pin 7384 is located above an upper surface of the guide plate 739. The pin 7384 is located at a side, far away from the waste box waiting position 35, of the inclined block 7372. After the waste box is conveyed to the waste box waiting position 35, the X-axis motor 736 drives, by means of the X-axis conveyor belt 734, the mounting base 738 to move along the horizontal guide rail 740 (the direction of X axis), so that the pushing rod 710 gets close to the inclined block 7372 gradually. When the pin 7384 of the adjusting base 760 is in contact with the inclined block 7372, the pin 7384 moves along an upper surface of the inclined block 7372, the tension spring drives the adjusting base 760 and the pushing rod 710 connected to the adjusting base 760 to move up along the vertical guide rail 750 (the direction of Z axis), so that the adjusting base 760 is placed on the upper surface of the guide plate 737, at this point, the pushing rod 710 is above the baffle 14 of the cuvette box 10 in the direction of Z axis. Then, the X-axis motor 736 drives the mounting base 738 to move along the horizontal guide rail 740 (the direction of X axis), so that the pushing rod 710 gets close to the waste box gradually. When moving to a floating end 7374 of the guide plate 737, the adjusting base 760 falls under gravity and drives the pushing rod 710 connected to the adjusting base 760 to move down along the vertical guide rail 750 (the direction of Z axis), the pin 7384 falls above an upper surface of the guide plate 739, so, when moving reversely along the horizontal guide rail 740, the pushing rod 710 can be abutted against the inside face of the baffle 14. When keeping moving reversely along the horizontal guide rail 740, the pushing rod 710 pushes the waste box to the waste box recycling position 32, at this point, the pushing rod 710 completes the first pushing. In the above process, when the pin 7384 is in contact with the inclined block 7372, the pin 7384 will push the inclined block 7372 to rotate, so that the pin 7384 is able to move to the side, far away from the waste box waiting position 35, of the inclined block 7372. The inclined block 7372 will return to the original position under the action of the tension spring 7375.

After the waste box is conveyed to the waste box recycling position 32, the X-axis motor 736 drives, by means of the X-axis conveyor belt 734, the mounting base 738 to move along the horizontal guide rail 740 (the direction of X axis), so that the pushing rod 710 gets close to the inclined block 7372 gradually, and the pin 7384 is in contact with the inclined block 7372. Then, the same process as the first pushing is repeated, after the adjusting base 760 moves to the floating end 7374 of the guide plate 737, and the adjusting base 760 falls under gravity, the pushing rod 710 is abutted against the outside face of the baffle 14. Then, the pushing rod 710 moves reversely along the horizontal guide rail 740 to push the waste box from the waste box outlet 404 to the outside of the frame 30*a*, at this point, the pushing rod 710 completes the second pushing.

Figure 11:
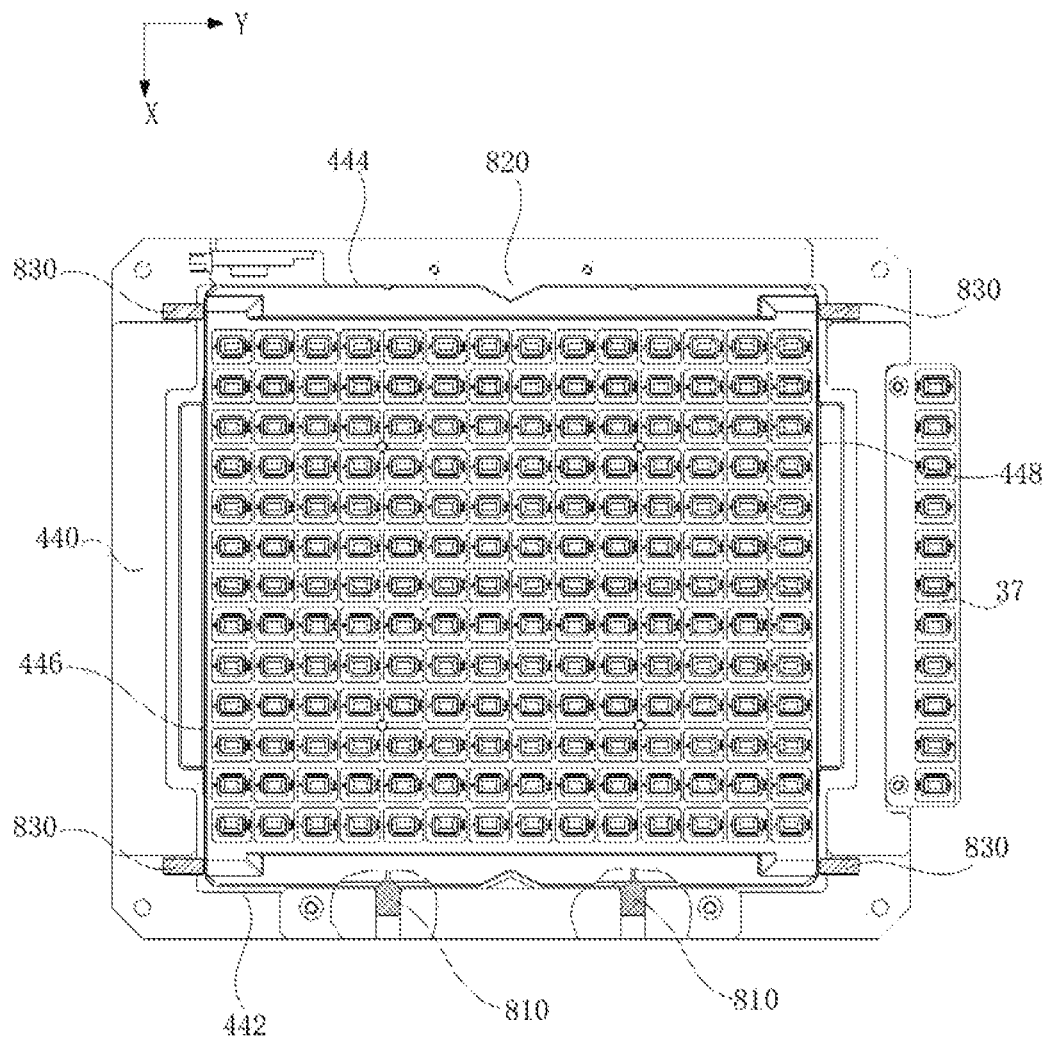
FIG. 11 is a top view of a lifting and locating component provided by an embodiment of the present disclosure.

As illustrated in FIG. 4 and FIG. 11, in some embodiments, a lifting positioning component is provided. The lifting positioning component includes the top plate 440 (operating plate 440). The inner wall (the inner wall of the through hole 440*a*) of the top plate 440 includes a first inner wall 442 and a second inner wall 444 which are arranged facing each other. A first protruding positioning member 810 is arranged on the first inner wall 442, and a second protruding positioning member 820 is arranged on the second inner wall 444. The first positioning member 810 and the second positioning member 820 correspond to the first positioning slot 162 and the second positioning slot 182, respectively. The first positioning member 810 is retractable. When the cuvette box extends in the through hole 440*a*, the first positioning member 810 can squeeze with the outer wall of the cuvette box to slide in the first positioning slot 162, and makes the second positioning member 820 lean tight against the second positioning slot 182. That is, in the process of conveying the new box to the operating position 33, the outer wall of the new box will squeeze the retractable first positioning member 810. When the first positioning member 810 slides in the first positioning slot 162, the first positioning member 810 pushes the new box to move towards the second positioning member 820, so that the first positioning member 810 leans tight against the first positioning slot 162, and the second positioning member 820 leans tight against the second positioning slot 182; in such a manner, a gap is eliminated, and the positioning is realized.

The lifting positioning component is a purely mechanical cuvette box positioning manner. Compared with the traditional manner of pressing to position in virtue of auxiliary members like an electrical pushing rod (this manner occupies extra working space of instruments, the implementation mode is complex, and once an auxiliary member malfunctions, the cuvette box cannot work normally), the lifting positioning component is simpler in structure and convenient for operation; besides, the lifting positioning component is reliable and safe, and does not occupy the extra working space of instruments.

In some embodiments, the sum of the number of the first positioning members 810 and the number of the second positioning members 820 is greater than or equal to 3. In some embodiments, there are two first positioning members 810, and there is one second positioning member 820. Three points not on the same line can firmly fix the new box on the top plate 440. In some embodiments, the first positioning members 810 and the second positioning member 820 are respectively on two relative inner walls, in the direction of X axis, of the top plate 440, that is, the first inner wall 442 and the second inner wall 444 are arranged with spacing along the direction of X axis.

In some embodiments, the shape and size of an end face of the first positioning member 810 match with the shape and size of the first positioning slot 162, and the shape and size of the end face of the second positioning member 820 match with the shape and size of the second positioning slot 182, so that a positioning effect is better; that is, the shape of the end face of the positioning member is approximately same as the shape of the positioning slot, and the size of the end face of the positioning member is approximately same as the size of the positioning slot. In some embodiments, the end face, matching with the first positioning slot 162, of the first positioning member 810 is a first arc surface, and the end face, matching with the second positioning slot 182, of the second positioning member 820 is a second arc surface. The radius corresponding to the first arc surface is less than the radius corresponding to the second arc surface.

In some embodiments, the first positioning member 810 is a positioning bead. In some other embodiments, the first positioning member 810 can also be an elastic element.

In some embodiments, the inner wall (the inner wall of the through hole 440a) of the top plate 440 includes a third inner wall 446 and a fourth inner wall 448 facing each other. Both the third inner wall 446 and the fourth inner wall 448 are provided with a protruding guide member 830, so that the gap between the cuvette box 10 and the third inner wall 446 and the fourth inner wall 448 is reduced, and it is more convenient for the first positioning member 810 and the first positioning slot 162 to align, and for the second positioning member 820 and the second positioning slot 182 to align.

In some embodiments, the number of the guide members 830 is four. The relative two inner walls, in the direction of Y axis, of the top plate 440 are respectively provided with two guide members 830, that is, the third inner wall 446 and the fourth inner wall 448 are arranged with spacing along the direction of Y axis.

In some embodiments, the through hole 440a is a square hole. The number of the guide members 830 is four. Two guide members 830 are arranged on two ends of the third inner wall 446, and the other two guide members 830 are arranged on two ends of the fourth inner wall 448, that is, the four guide members 830 are at four corners of the through hole 440a, respectively.

In some embodiments, the guide member 830 is a bearing. In some other embodiments, the guide member 830 is an inclined guide block.

In some embodiments, the cuvette box conveying device 30 further includes a new cuvette buffering position 37. The new cuvette buffering position 37 is arranged on the outer wall of the top plate 440. The new cuvette buffering position 37 includes a plurality of placing grooves 372 for placing the reaction cuvette, so that when the operating position 33 cannot provide the reaction cuvette, the new cuvette buffering position 37 can provide the reaction cuvette, thereby realizing continuous loading of the reaction cuvette 20.

In some embodiments, in the initialization stage of the chemiluminescence detector, a reaction cuvette grasper of the chemiluminescence detector can first grasp a plurality of reaction cuvettes at the operating position 33 to the new cuvette buffering position 37, and after there is no unoccupied placing groove 372 at the new cuvette buffering position 37, the reaction cuvette grasper can grasp a reaction cuvette from the new cuvette buffering position 37, and feed the reaction up to a reaction cuvette feeding-in position in the follow-up process. During a time interval of grasping the next reaction cuvette from the new cuvette buffering position 37 by the reaction cuvette grasper, the reaction cuvette grasper can first grasp a reaction cuvette from the operating position 33 and fill it at the new cuvette buffering position 37. When there is a new cuvette at the operating position 33, the new cuvette at the operating position 33 can fill the new cuvette buffering position 37, so that the new cuvette buffering position 37 is fully loaded, that is, after conveyed from the operating position 33 to the new cuvette buffering position 37, all the new cuvettes are conveyed to the reaction cuvette feeding-in position in the follow-up process from the new cuvette buffering position 37.

By setting the new cuvette buffering position 37, when the waste box is removed from the operating position 33 and replaced with the new box, there is no need to turn off the chemiluminescence detector, and the chemiluminescence detector can keep working, so the device has a function of continuously loading, and can meet the requirement for continuous loading.

The present disclosure further provides a cuvette box conveying method. The method includes the following steps.

At S910, a new box is conveyed from a new box placing position to an operating position along a first direction and the direction of Z axis. The first direction is the direction of X axis or the direction of Y axis. After all reaction cuvettes of the new box at the operating position are taken out, the new box at the operating position becomes a waste box.

At S920, the waste box is conveyed from the operating position to the waste box recycling position along the first direction and the direction of Z axis.

In some embodiments, S910 includes the following steps.

At S912, the new box is conveyed from the new box placing position to the new box waiting position along the positive direction of the first direction.

At S914, the new box is conveyed from the new box waiting position to the operating position along the positive direction of Z axis.

In some embodiments, S920 includes the following steps.

At S922, the waste box is conveyed from the operating position to the waste box waiting position along the negative direction of Z axis.

At S924, the waste box is conveyed from the waste box waiting position to the waste box recycling position along the negative direction of the first direction.

In some embodiments, before S910 is performed, the method further includes that: the new box is conveyed to the new box placing position along the positive direction of the first direction. After S920 is performed, the method further includes that: the waste is conveyed out along the negative direction of the first direction.

Figure 12:
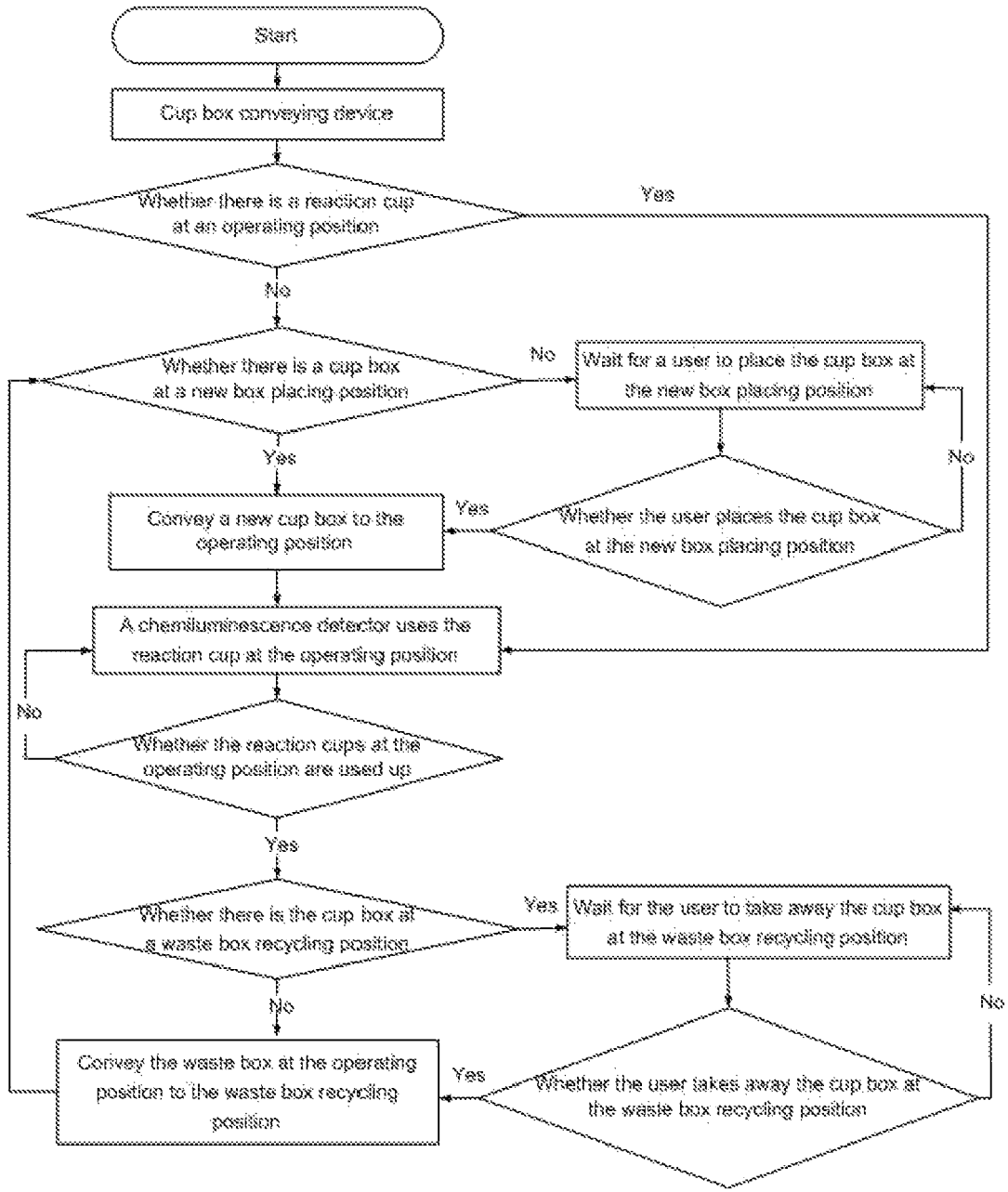
FIG. 12 is a work flow diagram of a cuvette box conveying device provided by an embodiment of the present disclosure.

As illustrated in FIG. 12, the cuvette box conveying device can work according to the work flow illustrated in FIG. 13.

It is to be noted that in the above description, an illustration is given by taking the direction of X axis of the XY plane as main body. After reading the application, those skilled in the art can understand that the direction of X axis in the above description can also be replaced with the direction of Y axis, that is, when an illustration is given by taking the first direction as main body, the first direction can be either the direction of X axis or the direction of Y axis.

The technical characteristics of the above embodiments can be combined at random. To make the description concise, not all possible combinations of these technical characteristics of the above embodiments are described, however, all the combinations of these technical characteristics shall fall within the scope of the specification, as long as there is no contradiction in the combinations of these technical characteristics.

The above embodiments only express several implementation modes of the present disclosure. The descriptions of these embodiments are more specific and detailed, but they cannot be understood as a limitation to the claimed scope of the present disclosure. It should be pointed out that those of ordinary skill in the art can also make several improvements and modifications without departing from the conception of the present disclosure, and these improvements and modifications should fall within the protection scope of protection of the present disclosure Therefore, the protection scope of the present disclosure is subject to the attached claims.

What is claimed is:

1. A cuvette box conveying device, comprising:
 a frame; the frame comprises different layers in a direction of Z axis; the cuvette box conveying device comprises a new box placing positions a waste box recycling position, an operating position, a new box waiting position and a waste box waiting position; the new box placing position and the waste box recycling position are arranged on the different layers in the direction of Z axis and have an overlapping area in the direction of Z axis, so as to reduce a space occupied by the new box placing position and the waste box recycling position on an XY plane; the operating position and the new box placing position are arranged on different layers and different positions in the direction of Z axis; and the operating position and the waste box placing position are arranged on different layers and different positions in the direction of Z axis;

the new box waiting position and the new box placing position are on a same layer, and the new box waiting position directly corresponds the operating position in the direction of Z axis, so that a new box at the new box waiting position reaches the operating position along a positive direction of Z axis; the waste box waiting position and the waste box recycling position are on a same layer, and the waste box waiting position directly corresponds the operating position in the direction of Z axis, so that a waste box at the operating position reaches the waste box waiting position along a negative direction of Z axis;

wherein the frame is provided with a new box inlet for the new box to pass through to reach the new box placing position, and a waste box outlet for the waste box to pass through to reach an outside of the frame from the waste box recycling position; a position relationship between the new box inlet and the waster box outlet satisfies the following conditions: the new box reaches the new box placing position from the new box inlet along a positive direction of a first direction, the waste box reaches, by means of the waste box outlet, the outside of the frame from the waste box recycling position along a negative direction of the first direction, and the first direction is one of a direction of X axis and a direction of Y axis;

the cuvette box conveying device comprises a first conveying mechanism, a Z-axis conveying mechanism, and a second conveying mechanism; the first conveying mechanism is able to convey a new box on the new box placing position to the new box waiting position along the positive direction of the first direction; the Z-axis conveying mechanism is able to convey the new box on the new box waiting position to the operating position along the positive direction of Z axis and is able to convey a waste box on the operating position to the waste box waiting position along the negative direction of Z axis; the second conveying mechanism is able to convey the waste box on the waste box waiting position to the waste box recycling position along the negative direction of the first direction; and wherein a cuvette box fully loaded with reaction cuvettes is the new box, after the reaction cuvettes in the new box are used up, the new box becomes the waste box.

2. The cuvette box conveying device as claimed in claim 1, wherein in the direction of Z axis, the waste box recycling position is between the new box placing position and the operating position.

3. The cuvette box conveying device as claimed in claim 1, wherein the position relationship between the new box waiting position and the waste box waiting position satisfies the following conditions: the new box reaches the new box waiting position from the new box placing position along the positive direction of the first direction, and the waste box reaches the waste box recycling position from the waste box waiting position along the negative direction of the first direction.

4. The cuvette box conveying device as claimed in claim 1, wherein the first conveying mechanism is also able to convey the new box at the new box inlet to the new box placing position along the positive direction of the first direction; the frame is provided with a new box detecting sensor which is at the new box placing position; when the new box detecting sensor senses the new box placed from the new box inlet, the first conveying mechanism starts to work, and conveys the new box at the new box inlet to the new box placing position along the positive direction of the first direction.

5. The cuvette box conveying device as claimed in claim 1, wherein the frame comprises a bottom plate, a middle plate and a top plate which are arranged in order on different layers; the bottom plate is a rectangular plate, two ends, in the first direction, of the bottom plate correspond to the new box placing position and the new box waiting position, respectively; the middle plate is arranged on the bottom plate, and the middle plate and the bottom plate are arranged separating from each other and facing each other in the direction of Z axis; the middle plate corresponds to the waste box recycling position; the top plate is arranged on the bottom plate, and the top plate and the bottom plate are arranged separating from each other and facing each other in the direction of Z axis; the top plate and the middle plate are arranged on different positions in the direction of Z axis; the top plate is provided with a through hole corresponding to the operating position, an area, which is located between the top plate and the bottom plate and is coplanar with the middle plate, corresponds to the waste box waiting position.

6. The cuvette box conveying device as claimed in claim 5, wherein a surface, facing the middle plate, of the bottom plate is provided with a protrusion fool-proof plate; the fool-proof plate fits into a fool-proof groove provided on the new box, so as to prevent the new box from being placed at the new box placing position reversely.

7. The cuvette box conveying device as claimed in claim 5, wherein the Z-axis conveying mechanism comprises a lifting plate which is able to move back and forth along the direction of Z axis, so as to bear the cuvette box at the new box waiting position, the operating position and the waste box waiting position; the cuvette box conveying device further comprises a barrier removing mechanism; the barrier removing mechanism is in retractable connection with the bottom plate; the barrier removing mechanism comprises a blocking member and a connecting plate which are connected with each other; the blocking member is at the new box placing position, and the connecting plate is at the new box waiting position; when the lifting plate presses down the connecting plate, the blocking member and the connecting plate retract in the bottom plate, so that the cuvette box is conveyed from the new box placing position to the new box waiting position; when the lifting plate and the connecting plate are spaced in the direction of Z axis, the blocking member and the connecting plate protrude out of the bottom plate, so as to block the cuvette box from being conveyed from the new box placing position to the new box waiting position.

8. The cuvette box conveying device as claimed in claim 5, wherein the second conveying mechanism is arranged on the middle plate; the second conveying mechanism comprises a pushing rod; the pushing rod is able to move back and forth in the first direction and the direction of Z axis; when there is a cuvette box at the waste box waiting position, a position of the pushing rod in the first direction and the direction of Z axis can be adjusted, so that the pushing rod hooks an inside, close to the waste box recycling position, of a baffle of the cuvette box; consequently, when the pushing rod moves away from the operating position along the first direction, the pushing rod is able to push the cuvette box from the waste box waiting position to the waste box recycling position; when there is a cuvette box at the waste box recycling position, a position of the pushing rod in the first direction and the direction of Z axis can be adjusted, so that the pushing rod hooks an outside, close to the operating position, of the baffle of the cuvette box; consequently, when the pushing rod moves away from the operating position along the first direction, the pushing rod is able to push the cuvette box from the waste box recycling position to the outside of the frame through the waste box outlet.

9. The cuvette box conveying device as claimed in claim 5, further comprising a new cuvette buffering position; the new cuvette buffering position is arranged on the top plate; the new cuvette buffering position comprises a plurality of placing grooves for placing a reaction cuvette.

10. The cuvette box conveying device as claimed in claim 1, wherein the second conveying mechanism is also able to convey the waste box at the waste box recycling position to the outside of the frame from the waste box outlet along the negative direction of the first direction.

11. The cuvette box conveying device as claimed in claim 1, wherein the frame further comprises a guide rod; the guide rod is arranged on one end, close to the new box placing position, of the top plate, and is separated from the middle plate in the direction of Z axis, so as to form a cuvette box passage for the cuvette box to pass through; the guide rod is used for preventing the lifting plate from moving far away from the direction of Z axis, so that the cuvette box reaches the operating position and the waste box recycling position accurately.

12. A cuvette box conveying method, wherein the cuvette box conveying method conveys a cuvette box by the cuvette box conveying device as claimed in claim 1, the cuvette box conveying method comprises: conveying the new box from the new box placing position to the operating position along the first direction and the direction of Z axis;
wherein, the first direction is the direction of X axis or the direction of Y axis; after all reaction cuvettes of the new box at the operating position are taken out, the new box at the operating position becomes the waste box; and conveying the waste box from the operating position to a waste box recycling position along the first direction and the direction of Z axis.

13. The cuvette box conveying method as claimed in claim 12, wherein conveying the new box from the new box placing position to the operating position along the first direction and the direction of Z axis comprises: conveying the new box from the new box placing position to the new box waiting position along the positive direction of the first direction, and conveying the new box from the new box waiting position to the operating position along the positive direction of the direction of Z axis; and/or conveying the waste box from the operating position to the waste box recycling position along the first direction and the direction of Z axis comprises: conveying the waste box from the operating position to the waste box waiting position along the negative direction of Z axis, and conveying the waste box from the waste box waiting position to the waste box recycling position along the negative direction of the first direction.

14. The cuvette box conveying method as claimed in claim 12, further comprising: conveying the new box to the new box placing position along the positive direction of the first direction; and/or, conveying the waste box out along the negative direction of the first direction.

* * * * *